United States Patent
Wise et al.

(10) Patent No.: US 11,698,620 B2
(45) Date of Patent: Jul. 11, 2023

(54) SPINDLE AND SPINDLE SYSTEM WITH LOGIC SUPPLY BUS FAULT DIAGNOSTICS

(71) Applicant: APEX BRANDS, INC, Apex, NC (US)

(72) Inventors: David Wise, Chapin, SC (US);
Andreas Abele, Tannhausen (DE);
Manfred Kogel, Westhausen (DE);
Ulrick Kaminski, Bartholoma (DE)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 17/781,684

(22) PCT Filed: Jan. 27, 2022

(86) PCT No.: PCT/US2022/014012
§ 371 (c)(1),
(2) Date: Jun. 1, 2022

(87) PCT Pub. No.: WO2022/164973
PCT Pub. Date: Aug. 4, 2022

(65) Prior Publication Data
US 2023/0152776 A1 May 18, 2023

Related U.S. Application Data

(60) Provisional application No. 63/142,195, filed on Jan. 27, 2021.

(51) Int. Cl.
*G05B 19/406* (2006.01)
(52) U.S. Cl.
CPC .. *G05B 19/406* (2013.01); *G05B 2219/50083* (2013.01)
(58) Field of Classification Search
CPC .................................................. G05B 19/406
(Continued)

(56) References Cited

U.S. PATENT DOCUMENTS

| 7,090,031 B2 | 8/2006 | Kaminski |
| 7,681,311 B2 | 3/2010 | Kaminski |

(Continued)

FOREIGN PATENT DOCUMENTS

| DE | 202011004846 U1 | 6/2011 |
| DE | 202011004847 U1 | 7/2011 |

OTHER PUBLICATIONS

International Search Report and Written Opinion dated Apr. 26, 2022 in International Application No. PCT/US2022/014012 filed Jan. 27, 2022.

(Continued)

*Primary Examiner* — Mohammad Ali
*Assistant Examiner* — Joshua T Sanders
(74) *Attorney, Agent, or Firm* — Burr & Forman LLP

(57) ABSTRACT

A spindle assembly includes a power source interface configured to be operably coupled to a power bus and power the spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The processing circuitry of the spindle controller may be configured to receive a fault localization instruction from a bus control device operably coupled to the logic supply bus, and control the diagnostic switch assembly to determine a presence and a location of a fault on the logic supply bus.

20 Claims, 4 Drawing Sheets

(58) Field of Classification Search
USPC .......................................................... 700/177
See application file for complete search history.

(56) References Cited

U.S. PATENT DOCUMENTS

| | | | |
|---|---|---|---|
| 9,114,537 B2 | 8/2015 | Wise et al. | |
| 10,864,623 B2 | 12/2020 | Wise et al. | |
| 2011/0234141 A1* | 9/2011 | Kataoka | G05B 19/406 |
| | | | 318/563 |
| 2015/0054444 A1* | 2/2015 | Tajima | G05B 19/406 |
| | | | 318/565 |
| 2017/0373630 A1* | 12/2017 | Figie | H02P 29/024 |
| 2019/0227502 A1* | 7/2019 | Nakamura | G05B 13/0265 |
| 2020/0183361 A1* | 6/2020 | Yura | G05B 19/406 |

OTHER PUBLICATIONS

First Office Action (with translation) issued in corresponding Chinese Application No. 202280001731.0 dated Feb. 2, 2023, all enclosed pages cited.

* cited by examiner

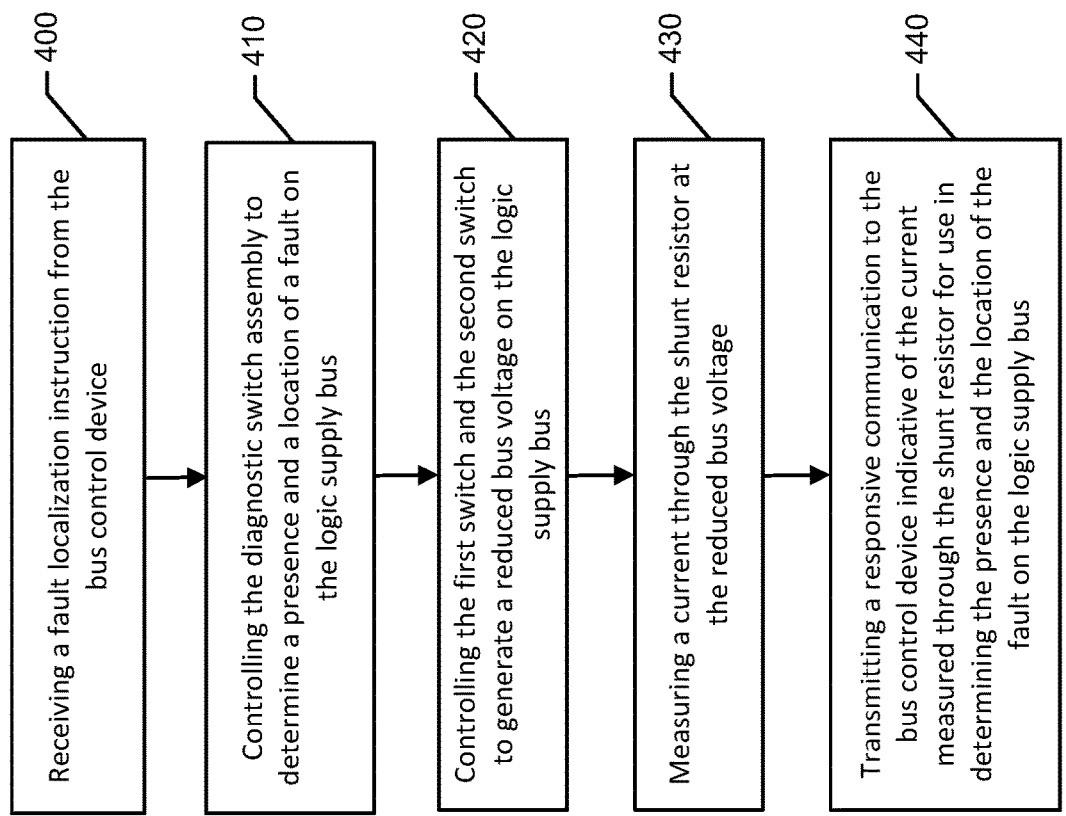

SPINDLE AND SPINDLE SYSTEM WITH LOGIC SUPPLY BUS FAULT DIAGNOSTICS

TECHNICAL FIELD

Example embodiments generally relate to manufacturing technology, and more particularly relate to diagnostics associated with spindle systems employed in a manufacturing environment.

BACKGROUND

Tightening spindles are commonly employed on a manufacture assembly line for the production of, for example, motor vehicles and the like. Such spindles are used in a variety of contexts, such as, to tighten fasteners (e.g., bolts, nuts, screws, or the like), perform drilling operations, or the like. Because such spindles can be implemented on a time and production-sensitive assembly line, any downtime of a spindle or the spindle system for unexpected maintenance or repair can impact production output and efficiency of the manufacturing facility. As such, the reliability of spindles is of high importance to manufacturing personnel to ensure that the facility is operating at levels that meet output goals. Additionally, if an unexpected outage of one or more spindles of a system occurs, tight timelines are put in place for repairing the one or more spindles of the system to have the facility back online.

However, in some conventional systems, diagnosing a spindle problem and locating the source of the problem quickly can be a challenge, particularly with respect to electrical faults on the system. In some instances, time-consuming processes are used that involve isolating each spindle in a system to diagnose the origin of a problem.

Accordingly, improvements in the area of proactive, and reactive, diagnostics in the context of spindle systems in manufacturing environments would be beneficial to improve system reliability and availability by reducing, for example, downtime associated with an outage. By bringing more predictability to the operation of spindles and quickly identifying the source of a problem, such solutions can assist with ensuring that production goals at manufacturing capabilities are met or exceeded.

BRIEF SUMMARY OF SOME EXAMPLES

According to some example embodiments, a spindle system is provided. The spindle system may comprise a bus control device and a plurality of spindle assemblies. The bus control device may be configured to control a power bus and a logic supply bus of the spindle system. Further, each spindle assembly of the plurality of spindle assemblies may be powered via an operable coupling to the power bus and the logic supply bus. Each spindle assembly may be controlled via communications with the bus control device. The plurality of spindle assemblies may comprise a first spindle assembly. The first spindle assembly may comprise a power source interface configured to be operably coupled to the power bus and power the first spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The processing circuitry of the spindle controller may be configured to receive a fault localization instruction from the bus control device, and control the diagnostic switch assembly to determine a presence and a location of a fault on the logic supply bus.

According to some example embodiments, another spindle system is provided. The spindle system may comprise a bus control device configured to control a power bus and a logic supply bus and a plurality of spindle assemblies. Each spindle assembly may be powered via an operable coupling to the power bus and the logic supply bus. Each spindle assembly may be controlled via communications with the bus control device. The plurality of spindle assemblies may comprises a first spindle assembly. The first spindle assembly may comprise a power source interface configured to be operably coupled to the power bus and power the first spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The diagnostic switch assembly may comprise a first switch, a second switch, and a shunt resistor connected to the logic supply bus. The first switch may be controllable to open circuit the logic supply bus and the second switch may be controllable to connect a resistance in series with the logic supply bus when the first switch is open. The processing circuitry of the spindle controller may be configured to receive a fault localization instruction from the bus control device, and control the diagnostic switch assembly to determine a presence and a location of a fault on the logic supply bus. To do so, the processing circuitry may be configured to control the first switch and the second switch to generate a reduced bus voltage on the logic supply bus. In this regard, the reduced bus voltage may be less than a nominal logic supply bus operating voltage. Further, the processing circuitry may be further configured to measure a current through the shunt resistor at the reduced bus voltage, and transmit a responsive communication to the bus control device indicative of the current measured through the shunt resistor for use in determining the presence and the location of the fault on the logic supply bus.

According to some example embodiments, a spindle assembly in provided that includes a power source interface configured to be operably coupled to a power bus and power the spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The processing circuitry of the spindle controller may be configured to receive a fault localization instruction from a bus control device operably coupled to the logic supply bus, and control the diagnostic switch assembly to determine a presence and a location of a fault on the logic supply bus.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 4 shows a flow chart of an example method to facilitate fault localization by a spindle assembly in accordance with an example embodiment.

DETAILED DESCRIPTION

Figure 1:
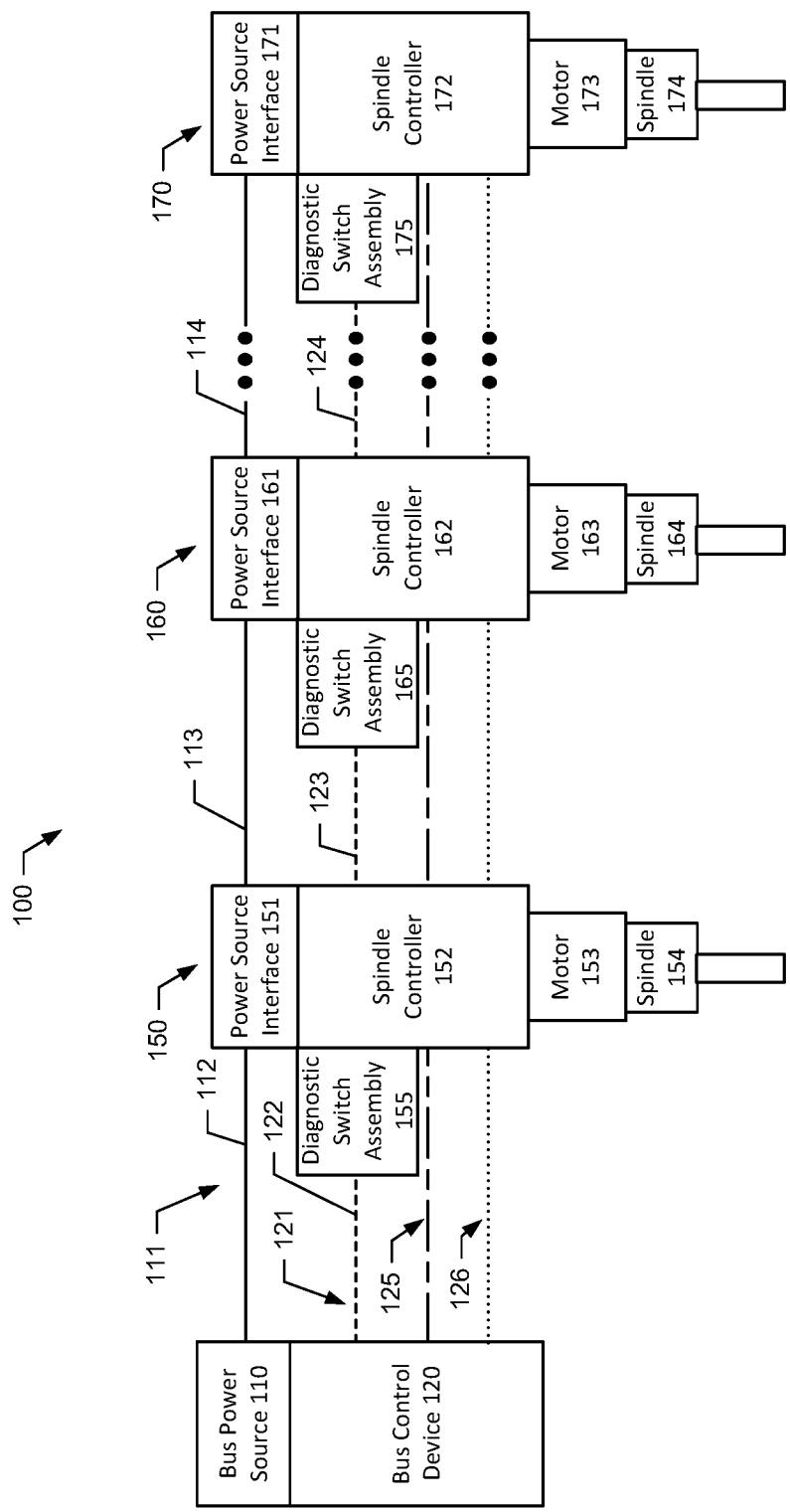
FIG. 1 illustrates an block diagram of an example spindle system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to some example embodiments, systems, apparatuses, and methods are provided that operate to perform diagnostic functions in relation to interconnected spindle assemblies, including identifying the location of a fault on the spindle system. In this regard, the spindles (e.g., tightening spindles) may be manufacturing tools that are used to perform work tasks (e.g., turning a fastener, drilling, etc.), that may be performed in a controlled fashion. Such spindle assemblies may be implemented on a manufacturing assembly line to, for example, construct items such as automobiles and the like.

According to some example embodiments, each spindle assembly may be connected as a component of an interconnected spindle system. In this regard, the spindle assemblies may be connected via, for example, a power bus, a logic supply bus, a communications bus, and a safe torque off bus. The power bus may supply power to the spindle assemblies, while the logic supply bus may operate to provide power to logic level circuitry of the spindle assemblies, such as processors and other integrated circuits. The spindle system may also comprise a communications bus, which may be wired or wireless, for delivering control instructions and related communications between the spindle assemblies and a bus control device. According to some example embodiments, the spindle assemblies may be connected in-line or in series, in an daisy-chain configuration, with respect to the power bus and the logic supply bus, where the output of a first spindle assembly may be an input of a second spindle assembly. The safe torque off bus may be used as a separate control line for placing one or more of the spindle assemblies in a safe torque off mode that, for example, deactivates the spindle assembly to protect the spindle system or to permit the spindle assembly to be maintained or repaired.

Spindle systems and the spindle assemblies within the spindle systems, may include various protective equipment to limit the damage to the system when an problem arises. In this regard, many systems include voltage and current monitoring, phase monitoring in multiphase systems, over-temperature and overcurrent protection at or for motors, servo overload protection, various forms of sub-system health monitoring, or the like. Typically, such protective equipment may reside at a source position to monitor, for example, the power bus downstream. These protective devices operate to identify the presence of a problem on the system, but do not operate to determine or indicate a location of the problem on the system for targeted repairs.

When electrical issues arise on the spindle system that cause an outage or potential damage to the system, the source of the issues may be difficult to determine. An upstream device, such as a control device for a bus, may include, for example, overcurrent protection equipment that can trip the system offline if an overcurrent condition is sensed at the upstream location. However, such equipment does not operate to indicate the specific downstream location of the problem that caused the overcurrent condition. Rather, such protective equipment is often only capable of determining that the overcurrent condition has occurred. As such, in some instances, to locate the source of the problem, the spindle assemblies of the spindle system may need to be manually isolated to individually test each spindle assembly and the cabling between assemblies to locate a source of an electrical issue on the system. Such manual actions are time consuming and require the system to be offline for substantial periods of time, leading to significant losses in productivity. Accordingly, due to the architecture of a spindle system according to some example embodiments, determining a location of a fault on, for example, the logic supply bus of the spindle system can be difficult.

The types of faults that might occur on, for example, a logic supply bus of a spindle system may include a disconnection event (e.g., due to a broken wire or connector resulting in a floating condition) or a short circuit event (e.g., due to an unintended connection between wires or ground as a result of, for example, a breakdown in the insulation between wires). Another type of fault may be an isolation failure, which may be a type of short circuit event. Accordingly, such faults may be occur in the cabling between the spindle assemblies. As mentioned above, conventional solutions merely detect the presence of such faults somewhere on the system with equipment located at the source of a bus, but are not able to locate where or which cabling or spindle assembly is causing the fault condition. Further, because various busses and wires may be bundled into a single cable (e.g., power bus, logic supply bus, emergency shut off bus, communications bus, ground bus, etc.) breakdowns in the insulation between the wires supporting the busses may lead to various types of faults. As such, according to some example embodiments, a technical solution to this technical problem of locating a fault is provided herein by, for example, controlling each of the spindle assemblies in manner that permits the location of the fault to be determined without having to manually disconnect and isolate each spindle assembly from the system.

In this regard, according to some example embodiments, intelligent spindle assemblies are described herein that are configured to assist with the determining the presence and location of faults on the spindle system in a rapid manner. By doing so, higher system reliability and availability can be achieved, leading to increased manufacturing output. In this regard, by identifying a source of an electrical issue quickly, the repair times and unplanned system down time can be substantially reduced.

System availability is a metric used to measure the percentage of time an asset (e.g., a spindle system or assembly) can be used for production. The system availability is a calculation of the system's probability of not being down for preventive maintenance, when the system is needed for production. As such, the system availability metric can allow maintenance teams to determine how much of an impact they are having on uptime and production.

In contrast, system reliability is the probability that an asset can perform without failure for a specific period of time, under normal operating conditions. In this regard, a reliable piece of equipment performs every time it is used, and therefore reliability is high in the absence of substantial unplanned downtime. As such, reliability is impacted by unplanned downtime, whereas availability is impacted by all downtime, planned and unplanned, including breakdowns, inspections, equipment changes, and more. If an asset never fails, it is 100% reliable. However, that same asset may be down for one of every 10 hours during a planned, routine inspection and would therefore have a 90% availability.

In the context of spindle systems, there is an expectation to diagnose problems, such as electrical problems, within 20 minutes of the occurrence of the problem and return the system to a productive state. Such timing goals for resolving issues are difficult to achieve with conventional solutions, giving rise to the need for more efficient diagnostic solutions within the context of spindle systems.

According to some example embodiments, spindle systems and spindle assemblies that are connected to the spindle systems described herein may include self-diagnosis capabilities and can therefore can assist in more rapidly identifying the location of a fault. To do so, according to some example embodiments, the spindle assemblies may being configured to use, for example, point-to-point communications capabilities, switchable capabilities for substrings of the logic supply bus, current monitoring at each spindle assembly, and the like.

As such, according to some example embodiments, each spindle assembly may include a diagnostic switch assembly that includes a plurality of controllable switches connected, for example, to the logic supply bus. A spindle controller for each spindle assembly may be configured to control the switches in response to a fault localization instruction issued by a bus control device to a respective spindle assembly. Such fault localization instructions may be addressed to a single spindle assembly, and the addressed spindle assembly may take diagnostic action, in response to receipt of the fault localization instruction, to determine if the fault is local to the addressed spindle assembly. In this regard, the spindle controller may control the diagnostic switch assembly to switch a resistor into series with the bus to cause a reduced voltage at the spindle assembly for a short period of time to facilitate determining that the fault has occurred local to the spindle assembly. If no fault is located, additional fault localization instructions may be sent to different spindle assemblies (e.g., moving downstream) to determine which spindle assembly is associated with the source of the fault.

FIG. 1 illustrates an example block diagram of a spindle system 100 according to some example embodiments. The spindle system 100 may comprise a bus power source 110, a bus control device 120, a communications bus 125, a safe torque off (STO) bus 126, and a plurality of spindle assemblies.

The bus power source 110 may be any type of electrical power source that supplies electrical power to the power bus 111. The bus power source 110 may comprise mains power at, for example, manufacturing facility where the spindle system 100 is implemented. Additionally or alternatively, the bus power source 110 may comprise a generator. The bus power source 110 may include control capabilities associated with supplying electrical power to the power bus 111 at a power bus nominal voltage, which, according to some example embodiments, may be 380 volts AC (alternating current). According to some example embodiments, the bus power source 110 may also comprise protection equipment to protect the power bus 111 from fault conditions. For example, the bus power source 110 may include hardware in the form of circuit breakers, fuses, or the like that are configured to sense fault conditions (e.g., overcurrent) on the power bus 111 and, for example, trip the power bus 111 offline or disconnect the power bus 111 from the bus power source 110, if such conditions are detected to protect the bus power source 110, the power bus 111, and the equipment connected thereto.

The bus control device 120, according to some example embodiments, will now be described, which may be coupled with bus power source 110 to operate as a singular unit and may be configured to control the bus power source 110. The bus control device 120 of the spindle system 100 may also include control circuitry (e.g., processor and memory) for controlling the operation of the logic supply bus 121. According to some example embodiments, the logic supply bus 121 may be representative of one or more busses that may be used in the context of a spindle system as described herein to provide a power supply to logic-level components, such as processors and other integrated circuitry of the spindle assemblies.

The bus control device 120 may be also be configured to communicate with the plurality of the spindle assemblies via, for example, a communications bus 125. According to some example embodiments, the communications bus 125 may employ a wired or wireless connection scheme that permits commutations to be exchanged between the bus control device 120 and the spindle assemblies. According to some example embodiments, the communications bus 125 may be connected to the spindle assembles in a daisy chain configuration. As such, via the communications bus 125, the bus control device 120 may be capable of controlling various activities of the spindle assemblies, including fault localization operations.

Again, the bus control device 120 may be configured to communicate with the spindle assemblies to control aspects of the functionalities of the spindle assemblies. For example, the bus control device 120 may be configured to perform system-level diagnostic functionalities by instructing the spindle assemblies to perform certain actions, such as actions associated with fault detection and location on the power bus 111 as well as on the logic supply bus 121. As such, according to some example embodiments, the bus control device 120 may operate in a master/slave configuration where the bus control device 120 operates as the master and the spindle assemblies operate as the slaves.

The bus control device 120 may control the supply of electrical power to the logic supply bus 121 at a logic supply bus nominal voltage, which, according to some example embodiments, may be 48 volts DC (direct current). According to some example embodiments, the bus control device 120 may also comprise protection equipment to protect the logic supply bus 121 from fault conditions that may occur on the logic supply bus 121. For example, the bus control device 120 may include hardware in the form of circuit breakers, fuses, or the like that are configured to sense fault conditions (e.g., overcurrent) on the logic supply bus 121 and, for example, trip the logic supply bus 121 offline or disconnect the logic supply bus 121 from a source if such conditions are detected to protect the bus control device 120, the logic supply bus 121, and the equipment connected thereto.

According to some example embodiments, the bus control device 120 may include a user interface. The user interface may include various input and output devices to facilitate user interaction with the bus control device 120. According to some example embodiments, the user interface may comprise a display that output information about the condition or status of the logic supply bus 121 and, for example, the protective equipment connected to the logic supply bus 121 and the spindle assemblies. According to some example embodiments, when a fault or other event is identified on, for example, the logic supply bus 121, the bus control device 120 may output information regarding the location of the fault or other event to the user, for example, via a display that shows the location of the fault or other event on a map of the spindle system. In this manner, the user may be able to review the information on the map of the spindle system indicating the location of the fault or other event, and physically move to problematic spindle assembly or cable to perform isolation and repairs.

The bus control device 120 may also control the STO bus 126. As mentioned above, the STO bus 126 may operate with associated circuitry to provide a basic drive integrated safety feature. The STO bus 126 may be leveraged to clear blockages, repair damage, or perform other maintenance on the spindle assemblies, without concern for accidental motor start. The STO bus 126 may comprise two wires or connections with one providing an STO+ signal and the other providing an STO− signal. The STO+ signal and the STO− signal are generated and monitored by the bus control device 120. The voltage STO+ to STO− is therefore monitored, according to some example embodiments. During boot up, the bus control device 120 may supply the STO+ and STO− signals to the STO bus 126 and, thus, to the spindle assemblies connected to the STO bus 126. According to some example embodiments, the signals STO+ and STO− may be protected by a polyswitch. In this regard, each spindle assembly may include an STO switch that is controllable for placing a given spindle assembly in a safe torque off mode to prevent motor operation. The bus control device 120 may be configured to monitor for short circuits, for example, on the STO bus, via digital signaling indicating signal OK or signal not OK (NOK). Accordingly, during system startup, the bus control device 120 may be configured to employ a cascade signal architecture by switching, in order (i.e., radially away from the bus control device 120), each spindle assembly into the safe torque off mode to determine the location of a point of failure via the STO bus 126 based on which spindle assemble was currently a focus of the cascade switching startup procedure. As such, the signals on the STO bus 126 may be used for localization of an error in an efficient manner and the location of the short circuit or other error can be mapped, for example, via the user interface.

As mentioned above, the spindle system 100 also includes a plurality of spindle assemblies. The spindle system 100, as shown in FIG. 1, includes three spindle assemblies 150, 160, and 170, but any number of spindle assemblies may be included in the spindle system 100. For purposes of explanation, the spindle assemblies 150, 160, and 170 are identical, but are connected to the spindle system 100 at different respective positions. In this regard, moving from the bus power source 110 and the bus control device 120 downstream, the spindle assembly 150 is the first spindle assembly, the spindle assembly 160 is the second spindle assembly, and the spindle assembly 170 is the third spindle assembly. The ellipses between spindle assembly 160 and spindle assembly 170 indicate that any number of spindle assemblies may be included between the two.

Referring to spindle assembly 150, the spindle assembly 150 may comprise a power source interface 151, a spindle controller 152, a motor 153, a spindle 154, and a diagnostic switch assembly 155. The power source interface 151 may be configured to operably couple the spindle assembly 150 to the power bus 111 and the bus power source 110 to power the spindle assembly 150. In the case of spindle assembly 150, due to the positioning within the spindle system 100, the power source interface 151 is coupled to the bus power source 110 via the connection 112 of the power bus 111.

According to some example embodiments, the power source interface 151 may comprise one or more electrical connectors that are configured to connect to a source of power at an input and provide connectors for an output that may operate as a source of power to a next downstream spindle assembly, in a daisy-chain configuration. As such, the power source interface 151 may be operably coupled to the power source interface 161 of the spindle assembly 160 to operate as a source of electrical power to the spindle assembly 160.

The diagnostic switch assembly 155 and the spindle controller 152 may be operably coupled to the logic supply bus 121. In this regard, the diagnostic switch assembly 155 may be operably coupled to the logic supply bus 121 to support diagnostic functionality under the control of the spindle controller 152, as further described herein. The spindle controller 152 may also be operably coupled to the logic supply bus 121 to support a variety of functionalities of the spindle controller 152. As mentioned above, communications to, for example, the bus control device 120 and spindle assemblies may be performed via the spindle controller 201 and the communications bus 125. Additionally, the spindle controller 152 may be operably coupled to the logic supply bus 121 for the purpose of sensing electrical activity (e.g., currents and voltages) of the logic supply bus 121, which may be used to determine if a fault has occurred on the logic supply bus 121. Additionally, the spindle controller 152 may be connected to the STO bus 126.

The spindle controller 152 may comprise processing circuitry, as further described below with respect to FIG. 2, that is configured to interact with, for example, the bus control device 120, the diagnostic switch assembly 155, the motor 153, and other components of the spindle system 100 or the spindle assembly 150. With respect to the motor 153, the spindle controller 152 may be configured to control power to and rotation of the motor 153 to control the operation of the spindle 154, which may be mechanically coupled to the motor 153. According to some example embodiments, the signals on the STO bus 126 may be provided to control an STO switch of the spindle controller 152 as a safety feature to control power to or operation of the motor 153. Together, the motor 153 and the spindle 154 may be referred to as a working apparatus. To assist in controlling the operation of the motor 153, the spindle assembly 150 may also include a servo amplifier that is controlled by the spindle controller 152. The spindle controller 152 may therefore be configured to control the motor 153 to cause the spindle 154 to perform a work task on a work piece, for example, in a manufacturing environment. In this regard, the spindle controller 152, operating as a measuring data processing unit, may include a transducer configured to measure the operation of the spindle 154, where, for example, the measurement may be used as feedback to adjust the operation of the spindle 154 for performing the work task. According to some example embodiments, such a transducer may comprise a Wheatstone bridge that is used for making the measurements, and a common fault that can occur in the spindle assembly 150 may involve one or more legs of the Wheatstone bridge failing (e.g., open circuit or short circuit). Such a failure may be an example of a fault that may be detectable as described herein.

The spindle controller 152 may also be configured to communicate with the bus control device 120 via the communications bus 125 as mentioned above. In this regard, the bus control device 120 may be configured to send communications to spindle controller 152 to instruct the spindle controller 152, and the spindle assembly 150, to perform a desired operation (e.g., perform a fault localization operation). Such a fault localization operation may comprise generating a reduced voltage short circuit current on the logic supply bus from a target spindle assembly for a limited time duration while overcurrent protective equipment (e.g., at the bus control device 120) is temporarily deactivated. Additionally or alternatively, the fault localization operation may comprise, according to some example embodiments, performing an isolation operation to disconnect the bus downstream from a spindle assembly to determine if an issue remains on the bus or is removed by the isolation operation as detected at the bus control device 120 or at the spindle controller 201. The spindle controller 152 may also be configured to provide information to the bus control device 120, via the communications bus 125, with measurement values and timestamps to facilitate, for example, determining a location of a fault on the spindle system 100 by the bus control device 120.

The spindle controller 152 may also operate to assist with detection electrical issues in the system 100 and the multibus cables by leveraging the STO bus 126. In this regard, as a device on the STO bus 126, the spindle controller 152 may be configured to control an STO switch and the operation of the STO switch may be detectable to determine whether the spindle controller 152 is operating properly on the STO bus 126 or not. As such, the spindle controller 152 may be leverage the STO bus 126 to identify system issues, as described herein.

As mentioned above, the spindle assemblies 160 and 170 may be same as the spindle assembly 150, although connected to the power bus 111 and the logic supply bus 121 at different locations. Accordingly, the power source interfaces 161 and 171 may be structured the same and operate in the same manner as the power source interface 151. The spindle controllers 162 and 172 may be structured the same and operate in the same manner as the spindle controller 152. The motors 163 and 173, and the spindles 164 and 174, are structured the same and operate in the same manner as the motor 153 and the spindle 154, respectively.

In this regard, according to some example embodiments, due to the daisy chain configuration, the spindle assembly 160 may be connected to the power bus 111 via connection 113 from the spindle assembly 150. Additionally, the spindle assembly 160 may be connected to the logic supply bus 121 via the connection 123 from the spindle assembly 150. Similarly, the spindle assembly 170 may be connected to the power bus 111 via connection 114 from the spindle assembly 160. Additionally, the spindle assembly 170 may be connected to the logic supply bus 121 via the connection 124 from the spindle assembly 160.

With respect to the operation of the spindle system 100, the bus control device 120 may be configured to control the various components of the spindle system 100, including the spindle assemblies 150, 160, and 170, to perform a fault localization process. The fault localization process may be caused or triggered to begin, in response to, the spindle system 100 executing a start-up process after the spindle system 100 has been powered down, has been inactive, or is being initially set up. In this regard, after the start-up process is complete and no fault is found (e.g., on the logic supply bus 121), the bus control device 120 may energize the power bus 111 as part of the start-up process. Alternatively or additionally, the fault localization process may be caused or triggered to begin, in response to, the bus control device 120 detecting a fault (of unknown origin) on the logic supply bus 121, however, without having determined the locations of the faults.

To determine a location of a fault on the logic supply bus 121, the bus control device 120 may cause a sequence of operations or tests to be performed by each spindle assembly to determine if a fault has occurred at the spindle assembly or cabling local to the spindle assembly that is currently under test. The tests may involve the spindle controllers of the spindle system 100, for example, individually switching a diagnostic resistor onto the logic supply bus 121, in series, to generate a reduced voltage, as further described below, and measuring a current through a shunt resistor at the spindle assembly for fault detection both at the spindle assembly and at the bus control device 120. By causing the spindle assemblies to each perform such a test, also referred to as a fault localization operation, the bus control device 120 can pinpoint which spindle assembly or associated cabling is causing a fault on the logic supply bus 121.

In this regard, the bus control device 120 may communicate instructions, via the logic supply bus 121, to each spindle assembly, to cause each spindle assembly to perform a fault detection operation at the spindle assembly. According to some example embodiments, the instructions may be communicated as fault localization instructions, and the fault localization instructions may be provided to cause the spindle assemblies to perform the fault localization operation, one at a time, from upstream to downstream, to permit the bus control device 120 to detect which of the spindle assemblies is causing the fault. Since, according to some example embodiments, the spindle assemblies are connected in a daisy chain configuration, the fault localization instructions may be provided to cause the spindle assemblies to perform the fault localization operation in order from upstream to downstream (e.g., serially) from the bus control device 120. In this regard, for example, the bus control device 120 may iteratively send a respective fault localization instruction as one of a series of fault localization instructions that is specifically addressed (i.e., includes a unique identifier of the spindle assembly) to the next downstream spindle assembly to cause that spindle assembly to perform the fault localization operation. If a fault condition is identified, a timestamped record may be stored in a non-volatile memory of the bus control device 120 with measurements of electrical parameters during the event. In this regard, according to some example embodiments, the bus control device 120 may be configured to transmit the fault localization instruction with an address to selected spindle assembly to cause only that spindle assembly to act upon the fault localization instruction.

According to some example embodiments, with respect to the localization process, after already instructing the spindle assembly 150 to perform a fault localization operation and determining that no fault is present at the spindle assembly 150, the bus control device 120 may, for example, subsequently send the next downstream spindle assembly, in this case the spindle assembly 160, a fault localization instruction. In response to receipt of the fault localization instruction, the spindle controller 162 of the spindle assembly 160 may control the diagnostic switch assembly 165 to facilitate a process for determining a presence and a location of a fault on the logic supply bus 121 at or within the spindle assembly 160. As further described below, the diagnostic switch assembly 165 may comprise a shunt resistor connected to the logic supply bus 121, and the spindle controller 162 may be configured to measure a current through the shunt resistor after having adjusted switches of the diagnostic switch assembly 165 to cause a reduced voltage. The current through the shunt resistor of the spindle assembly 160 may be seen by upstream devices such as spindle assembly 150 and the bus control device 120. However, downstream devices, such as spindle assembly 170 may see no current during the operation at spindle assembly 160.

The spindle controller 162 may be further configured to transmit a responsive communication to the bus control device 120 indicative of the current measured through the shunt resistor for use in determining the presence and the location of the fault on the logic supply bus 121. If, for example, a fault is causing current to flow, the current through the shunt resistor may be, for example, less than expected (i.e., less than a threshold amount), which may be indicative of a fault on the system. As such, the current through the shunt resistor at each spindle assembly can be monitored and reported to the bus control device 120 to determine the location of the fault on the spindle system 100.

If no fault is detected at spindle assembly 160, the fault localization process may proceed to test the next spindle assembly that is downstream. To do so, again a fault localization instruction may be sent to the next downstream spindle assembly to determine a fault condition. The process may continue downstream, to each downstream device, for example, until all spindle assemblies have performed a fault localization operation and a fault has either been located or it can be determined that no fault is present on the logic supply bus 121.

The bus control device 120 may also control the STO bus 126 as a portion of the fault localization process. In this regard, the process involving the STO bus 126 may be, for example, part of a start-up or boot up process for the spindle system 100. During boot up, the bus control device 120 may supply the STO+ and STO− signals to the STO bus 126 (e.g., on respective wires or connections) and, thus to the spindle controllers of the spindle assemblies. As mentioned above, the bus control device 120 may be configured to monitor for short circuits, for example, on the STO bus, via digital signaling indicating signal OK or signal not OK (NOK). Accordingly, during system startup, the bus control device 120 may be configured to employ a cascade signal architecture by controlling switching via the STO bus 126 of an STO switch 241, in order (e.g., radially away from the bus control device 120 to the end of the line, for example, due to a daisy chain configuration). As such, each spindle controller, in order, may be transitioned into the safe torque off mode and operation in the safe torque mode can be confirmed, e.g., via the OK or NOK signals, to determine the presence of a fault or other connectively issue on the STO bus 126 or the cabling for the STO bus 126 that is shared with other buses (e.g., the power bus 111, the logic supply bus 121, the communications bus 125). Additionally, since the STO signals from the bus control device 120 are addressed or otherwise directed to a specific spindle assembly, the location of a point of failure may be determined via the STO bus 126 based on which spindle assembly was currently receiving the STO signal. As such, control of the STO bus 126 may also be performed to identify faults as part of a fault localization. Further, the processing circuitry of the spindle controller may be configured to receive a safe torque off (STO) signal from the bus control device 120, and control an STO switch of the spindle assembly to determine a presence and a location of a fault on the STO bus.

Figure 2:
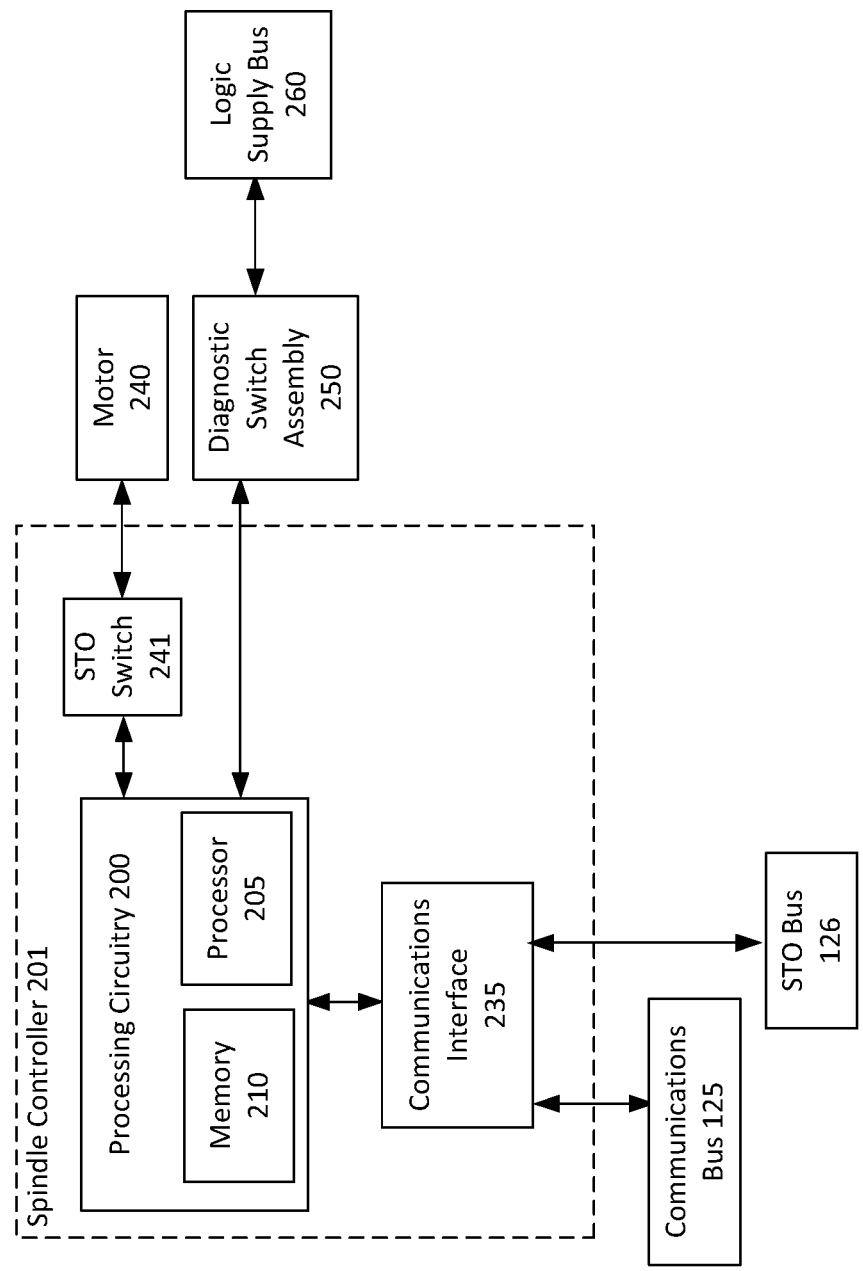
FIG. 2 illustrates a block diagram of an example spindle controller in association accordance with an example embodiment.

Now referring to FIG. 2, an example configuration of a spindle controller 201 is provided as a more detailed block diagram of some components. The spindle controller 201 may be the same or similar to the spindle controller 152, 162, or 172. In this regard, spindle controller 201 comprises processing circuitry 200. Processing circuitry 200 may, in turn, comprise a processor 205, a memory 210, and a communications interface 235. Additionally, the spindle controller 201 may include additional components not shown in FIG. 2 and the processing circuitry 200 may be operably coupled to other components of a spindle assembly that are also not shown in FIG. 2.

Further, according to some example embodiments, processing circuitry 200 may be in operative communication with or embody, the memory 210, the processor 205, and the communications interface 235. Through configuration and operation of the memory 210, the processor 205, and the communications interface 235, the spindle controller 201 may be configurable to perform various operations as described herein, including the operations and functionalities described with respect to the spindle assemblies. In this regard, the processing circuitry 200 may be configured to perform computational processing, memory management, fault localization control and monitoring, and manage remote communications, according to an example embodiment. In some embodiments, the processing circuitry 200 may be embodied as a chip or chip set. In other words, the processing circuitry 200 may comprise one or more physical packages (e.g., chips) including materials, components or wires on a structural assembly (e.g., a baseboard). The processing circuitry 200 may be configured to receive inputs (e.g., via peripheral components), perform actions based on the inputs, and generate outputs (e.g., for provision to peripheral components). In an example embodiment, the processing circuitry 200 may include one or more instances of a processor 205, associated circuitry, and memory 210. As such, the processing circuitry 200 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 210 may include one or more non-transitory memory devices such as, for example, volatile or non-volatile memory that may be either fixed or removable. The memory 210 may be configured to store information, data, applications, instructions or the like for enabling, for example, the functionalities described with respect to a spindle assembly. The memory 210 may operate to buffer instructions and data during operation of the processing circuitry 200 to support higher-level functionalities, and may also be configured to store instructions for execution by the processing circuitry 200. The memory 210 may also store various information including measurements or spindle control parameters. According to some example embodiments, various data stored in the memory 210 may be generated based on other data and stored or the data may be retrieved via the communications interface 235 and stored in the memory 210.

As mentioned above, the processing circuitry 200 may be embodied in a number of different ways. For example, the processing circuitry 200 may be embodied as various processing means such as one or more processors 205 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 200 may be configured to execute instructions stored in the memory 210 or otherwise accessible to the processing circuitry 200. As such, whether configured by hardware or by a combination of hardware and software, the processing circuitry 200 may represent an entity (e.g., physically embodied in circuitry—in the form of processing circuitry 200) capable of performing operations according to example embodiments while configured accordingly. Thus, for example, when the processing circuitry 200 is embodied as an ASIC, FPGA, or the like, the processing circuitry 200 may be specifically configured hardware for conducting the operations described herein. Alternatively, as another example, when the processing circuitry 200 is embodied as an executor of software instructions, the instructions may specifically configure the processing circuitry 200 to perform the operations described herein.

The communication interface 235 may include one or more interface mechanisms for enabling communication with other devices external to the spindle assembly, via, for example, the communications bus 125. Further, logic supply bus 260 may connected to the bus control device 120 as described with respect to the logic supply bus 121 of FIG. 1. Additionally, the communication interface 235 may be configured to form a communications link to, for example, be a local area network, the Internet, or the like, through a direct (wired or wireless) communication link to another external device, or the like. In some cases, the communication interface 235 may be any means such as a device or circuitry embodied in either hardware, or a combination of hardware and software that is configured to receive or transmit data from/to devices in communication with the processing circuitry 200. The communications interface 235 may be a wired or wireless interface and may support various communications protocols (e.g., ARCNET, IEEE 802.11 protocols, WIFI, Bluetooth, cellular, or the like).

Additionally, the processing circuitry 200 may be operably coupled to a motor 240 (which may be the same or similar to the motors 153, 163, or 173) of a spindle assembly to control the operation of the motor 240 and a spindle that is mechanically coupled to the motor 240. Further, the processing circuitry 200 may also be operably coupled to a diagnostic switch assembly 250 (which may be the same or similar to the diagnostic switch assembly 155, 165, or 175) to control switches of the diagnostic switch assembly 250 and take measurements of electrical characteristics associated with the logic supply bus 260, as further described herein.

Figure 3:
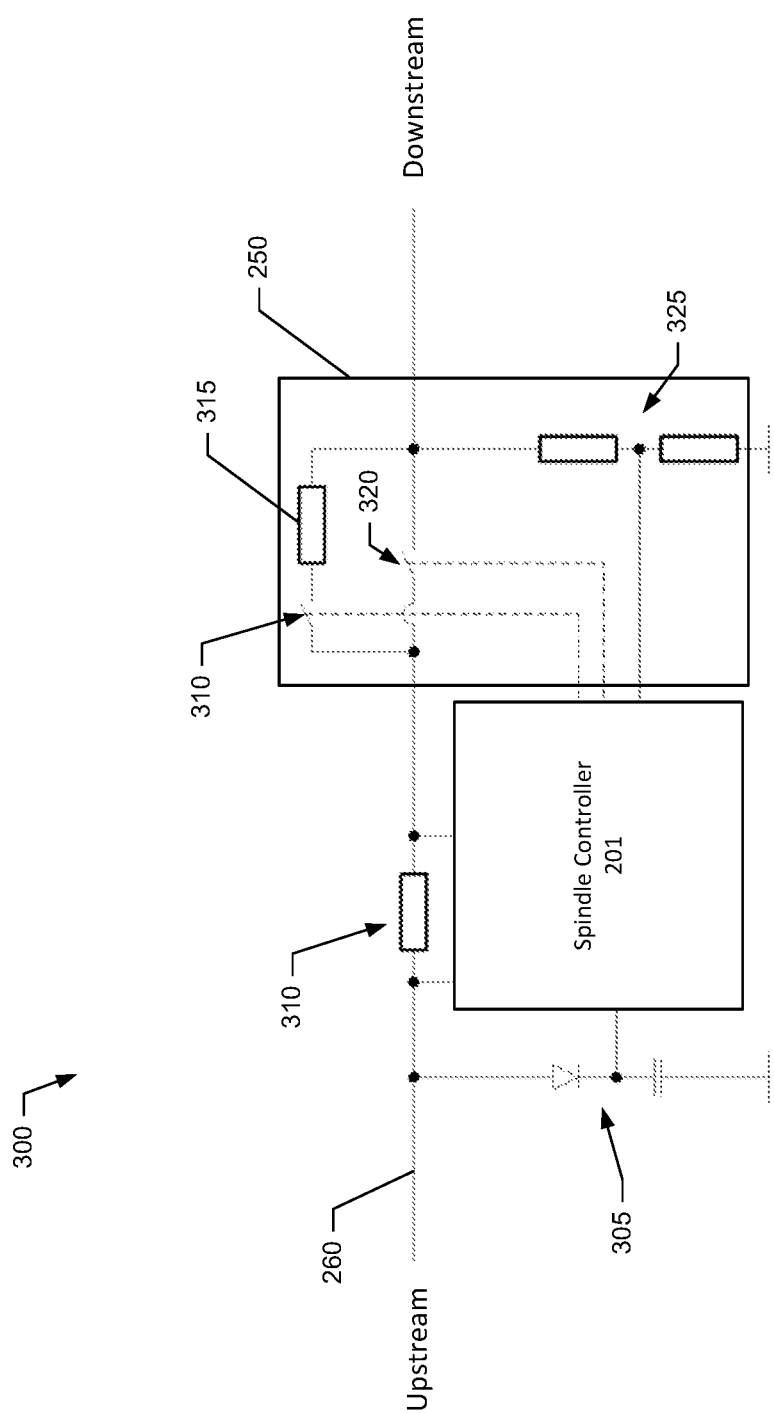
FIG. 3 is a schematic diagram of some components of a spindle assembly in accordance with an example embodiment.

Now referring to FIG. 3, a schematic diagram of some components of the configuration of a spindle assembly 300, according to some example embodiments, is shown. In this regard, the spindle assembly 300 may be same or similar to the spindle assembly 150, 160, or 170. The spindle assembly 300 is shown with a more detailed schematic of some of the connections or operable couplings of the spindle controller 201 and the diagnostic switch assembly 250, in association with the logic supply bus 260.

In this regard, the upstream and downstream ends of the logic supply bus 260, passing through the spindle assembly 300, are shown. The spindle assembly 300 may be the same or similar in both structure and function as the spindle assemblies 150, 160, and 170 described with respect to FIG. 1 and otherwise herein. In association with the logic supply bus 260, the spindle assembly 300 comprises the spindle controller 201, the diagnostic switch assembly 250, a controller source circuit 305, and a shunt resistor 310. Further, the diagnostic switch assembly 250 may comprise a diagnostic resistor 315, a first switch 310, a second switch 320, and a voltage divider 325. Notably, the diagnostic switch assembly 250 may be same or similar to the diagnostic switch assemblies 155, 165, and 175 described herein.

In operation, the spindle controller 201 may be powered via the controller source circuit 305, which may be configured to provide a clean voltage source to the spindle controller 201 due to the operation of the capacitor and the diode. Further, spindle controller 201 may be connect across the shunt resistor 310 and may therefore be configured to operate as an ammeter to measure the current through the shunt resistor 310 when requested to do so. Further, the spindle controller 201 may be connected to the switches 310 and 320 via a control line that permits the spindle controller 201 to change a state of each switch 310 and 320 between an open state and a closed state. The switches 310 and 320 may any type of controllable switches, such as, relays, transistors, or the like. The spindle controller 201 may be also be connected to the voltage divider 325 which may be configured to provide a measurement point for the spindle controller 201 to measure a voltage that is indicative of the voltage on the logic supply bus 260.

As such, when the spindle controller 201 receives a fault localization instruction (via the communications bus 125 which is not shown), the spindle controller 201 may be configured to take action with respect to the diagnostic switch assembly 250. In this regard, the switch 310 may be normally open and the switch 320 may be normally closed, when the spindle controller 201 is not performing a fault localization operation. However, in response to receipt of the fault localization instruction, the spindle controller 201 may be configured to open the switch 320 and close the switch 310. As such, the switch 320 may be configured to open circuit the logic supply bus 260 and the switch 310 may be configured to connect a resistance (in the form of the diagnostic resistor 315) in series with the logic supply bus 260. In this configuration, the diagnostic resistor 315 is switched into series with the logic supply bus 260, thereby causing a reduced voltage, for example, at the voltage divider 325. The reduced voltage may be less than the nominal voltage of the logic supply bus 260, under normal operating conditions, and may affect the current flowing through the shunt resistor 310. In this configuration, the current through the shunt resistor 310 and the voltage at the voltage divider 325 may be measured by the spindle controller 201 for use in determining a location of a fault on the logic supply bus 260. Further, according to some example embodiments, the spindle controller 201 may be configured to drive a short circuit condition at the spindle assembly 300 and the current through the shunt resistor 310 may be indicative of the short circuit current, however, at the reduced voltage due to the resistor 315. Because the protection equipment at the bus control device 120 may sensitive to such short circuit current, the overcurrent protection at the bus control device 120 may be adjusted to be desensitized or even turned off for a period of time (e.g., less than or equal to 4 microseconds) while the spindle controller 201 is performing the fault localization operation for the spindle assembly 300 by generating a short circuit current. The spindle controller 201 may provide the measurements to the bus control device 120 for analysis as part of the fault localization process. Further, once the measurements are complete, the spindle controller 201 may be configured to return the switches 310 and 320 to their normal operating positions (i.e., switch 310 is open and switch 320 is closed).

Alternatively, in response to the fault localization instruction, an isolation action may be performed to serially isolate portions of the logic supply bus 260 to determine if the fault being detected at the source is removed from the system when target spindle assemblies are removed from the bus. Again, such an isolation process may be performed serially from upstream to downstream. In this regard, to perform the isolation operation, the spindle controller 201 may be configured to open both switch 310 and switch 320. In this configuration, the bus control device 120 may be configured to use a sensor to sense a voltage or current on the logic supply bus 260 to determine if the previously detected electrical issue has been removed from the system via the isolation operation. If a threshold change in, for example, the current or voltage is sensed, then a determination of the location of the fault may be made by the bus control device 120. In either example scenario, the spindle controller 201 may be configured to receive a fault localization instruction from the bus control device 120, and control the diagnostic switch assembly 250 to determine a presence and a location of a fault on the logic supply bus 260.

Additionally, according to some example embodiments, diagnostic switch assembly 250 may also be leveraged to perform other operations that may, or may not be related to diagnostics. For example, the switch 320 may also be controlled to operate in an emergency stop mode. In this regard, the spindle controller 201 may receive an instruction to enter the emergency stop mode from, for example, the bus control device 120. In response to receipt of this instruction, the spindle controller 201 may be configured to open the switch 320, while also maintaining the switch 310 in the open position. As such, logic supply bus power or connection to the downstream spindle assemblies on the logic supply bus 260 may be interrupted.

According to some example embodiments, an example method is provided, as shown in FIG. 4, that may be implemented by a spindle assembly, such as spindle assembly 150 and the spindle controller 152. In this regard, at 400, the example method may comprise receiving a fault localization instruction from the bus control device. Additionally, at 410, the example method may comprise controlling the diagnostic switch assembly to determine a presence and a location of a fault on the logic supply bus. In this regard, according to some example embodiments, the example method may comprise, at 420, controlling the first switch and the second switch of the diagnostic switch assembly to generate a reduced bus voltage on the logic supply bus. The reduced bus voltage may be less than a nominal logic supply bus operating voltage. The example method may further comprise, at 430, measuring a current through a shunt resistor at the reduced bus voltage. Additionally, at 440, the example method may comprise transmitting a responsive communication to the bus control device indicative of the current measured through the shunt resistor for use in determining the presence and the location of the fault on the logic supply bus.

As such, according to some example embodiments, a spindle system is provided. The spindle system may comprise a bus control device and a plurality of spindle assemblies. The bus control device may be configured to control a power bus and a logic supply bus of the spindle system. Further, each spindle assembly of the plurality of spindle assemblies may be powered via an operable coupling to the power bus and the logic supply bus. Each spindle assembly may be controlled via communications with the bus control device. The plurality of spindle assemblies may comprise a first spindle assembly. The first spindle assembly may comprise a power source interface configured to be operably coupled to the power bus and power the first spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The processing circuitry of the spindle controller may be configured to receive a fault localization instruction from the bus control device, and control the diagnostic switch assembly to determine a presence and a location of a fault on the logic supply bus.

The example spindle system described above may be modified, augmented, or may include optional additions, some of which are described herein. The modifications, augmentations or optional additions listed below are some examples of elements that may be added in any desirable combination.

Within this context, the example spindle system as described above may be considered a first embodiment, and other embodiments may be defined by each respective combination of modifications, augmentations or optional additions. For example, in a second embodiment the diagnostic switch assembly may further comprise a shunt resistor connected to the logic supply bus, and the processing circuitry may be configured to measure a current through the shunt resistor. Additionally, in a third embodiment the processing circuitry of the spindle controller may be further configured to transmit a responsive communication to the bus control device indicative of the current measured through the shunt resistor for use in determining the presence and the location of the fault on the logic supply bus. The third embodiment may be combined with any or all of embodiments one or two, as appropriate. For a fourth embodiment, the bus control device may be configured to transmit the fault localization instruction to the first spindle assembly in response to detecting the fault on the logic supply bus. The fourth embodiment may be combined with any or all of embodiments one to three, as appropriate. In a fifth embodiment, the bus control device may be configured to transmit the fault localization instruction to the first spindle assembly in response to a start-up operation of the spindle system. The fifth embodiment may be combined with any or all of embodiments one to four, as appropriate. In a sixth embodiment, the bus control device may be configured to transmit the fault localization instruction with an address of the first spindle assembly to cause only the first spindle assembly of the plurality of spindle assemblies to act upon the fault localization instruction. The sixth embodiment may be combined with any or all of embodiments one to five, as appropriate. In a seventh embodiment, the bus control device may be configured to transmit the fault localization instruction as one of a series of fault localization instructions, and each fault localization instruction in the series of fault localization instructions may be addressed to a respective one of the plurality of spindle assemblies. The seventh embodiment may be combined with any or all of embodiments one to six, as appropriate. In an eighth embodiment, the bus control device may be configured to transmit the series of fault localization instructions in an order moving serially downstream from a power source of the logic supply bus. The eighth embodiment may be combined with any or all of embodiments one to seven, as appropriate. In a ninth embodiment, the plurality of spindle assemblies may be configured to be connected in a daisy-chain configuration with respect to the logic supply bus. The ninth embodiment may be combined with any or all of embodiments one to eight, as appropriate. In a tenth embodiment, the diagnostic switch assembly may comprise a first switch and a second switch, and the first switch may be controllable to open circuit the logic supply bus and the second switch may be controllable to connect a resistance in series with the logic supply bus when the first switch is open. The tenth embodiment may be combined with any or all of embodiments one to nine, as appropriate. In an eleventh embodiment, the processing circuitry of the spindle controller may be configured to control the diagnostic switch assembly to control the first switch and the second switch to generate a reduced bus voltage on the logic supply bus, and the reduced bus voltage may be less than a nominal logic supply bus operating voltage. The eleventh embodiment may be combined with any or all of embodiments one to ten, as appropriate. In an twelfth embodiment, the nominal logic supply bus operating voltage is 48 volts and a nominal power bus operating voltage is 380 volts. The twelfth embodiment may be combined with any or all of embodiments one to eleven, as appropriate.

According to some example embodiments, another example embodiment of a spindle system is provided. The spindle system may comprise a bus control device configured to control a power bus and a logic supply bus and a plurality of spindle assemblies. Each spindle assembly may be powered via an operable coupling to the power bus and the logic supply bus. Each spindle assembly may be controlled via communications with the bus control device. The plurality of spindle assemblies may comprises a first spindle assembly. The first spindle assembly may comprise a power source interface configured to be operably coupled to the power bus and power the first spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The diagnostic switch assembly may comprise a first switch, a second switch, and a shunt resistor connected to the logic supply bus. The first switch may be controllable to open circuit the logic supply bus and the second switch may be controllable to connect a resistance in series with the logic supply bus when the first switch is open. The processing circuitry of the spindle controller may be configured to receive a fault localization instruction from the bus control device, and control the diagnostic switch assembly to determine a presence and a location of a fault on the logic supply bus. To do so, the processing circuitry may be configured to control the first switch and the second switch to generate a reduced bus voltage on the logic supply bus. In this regard, the reduced bus voltage may be less than a nominal logic supply bus operating voltage. Further, the processing circuitry may be further configured to measure a current through the shunt resistor at the reduced bus voltage, and transmit a responsive communication to the bus control device indicative of the current measured through the shunt resistor for use in determining the presence and the location of the fault on the logic supply bus.

The example spindle system described above may be modified, augmented, or may include optional additions, some of which are described herein. The modifications, augmentations or optional additions listed below are some examples of elements that may be added in any desirable combination. Within this context, the example spindle system as described above may be considered a thirteenth embodiment, and other embodiments may be defined by each respective combination of modifications, augmentations or optional additions. For example, in an fourteenth embodiment, the bus control device may be configured to transmit the fault localization instruction as one of a series of fault localization instructions in an order moving serially downstream from a power source of the logic supply bus, and each fault localization instruction in the series of fault localization instructions may be addressed to a respective one of the plurality of spindle assemblies. Alternatively, in a fifteenth embodiment, the plurality of spindle assemblies may be configured to be connected in a daisy-chain configuration with respect to the logic supply bus. The fifteenth embodiment may be combined with any or all of embodiments thirteen to fourteen, as appropriate.

According to some example embodiments, an example spindle assembly is provided. The example spindle assembly may include a power source interface configured to be operably coupled to a power bus and power the spindle assembly via the power bus, a spindle controller comprising processing circuitry, a diagnostic switch assembly operably coupled to the spindle controller and operably coupled to a logic supply bus, and a working apparatus comprising a motor and a spindle operably coupled to the spindle controller. The working apparatus may be controllable by the spindle controller to act upon a work piece to perform a work task. The processing circuitry of the spindle controller may be configured to receive a fault localization instruction from a bus control device operably coupled to the logic supply bus, and control the diagnostic switch assembly to determine a presence and a location of a fault on the logic supply bus.

The example spindle assembly described above may be modified, augmented, or may include optional additions, some of which are described herein. The modifications, augmentations or optional additions listed below are some examples of elements that may be added in any desirable combination. Within this context, the example spindle assembly as described above may be considered a sixteenth embodiment, and other embodiments may be defined by each respective combination of modifications, augmentations or optional additions. For example, in an seventeenth embodiment, the diagnostic switch assembly may further comprise a shunt resistor connected to the logic supply bus, and the processing circuitry may be configured to measure a current through the shunt resistor and transmit a responsive communication to the bus control device indicative of the current measured through the shunt resistor for use in determining the presence and the location of the fault on the logic supply bus. Alternatively or additionally, in an eighteenth embodiment, the diagnostic switch assembly may comprise a first switch and a second switch, and the first switch may be controllable to open circuit the logic supply bus and the second switch may be controllable to connect a resistance in series with the logic supply bus when the first switch is open. The eighteenth embodiment may be combined with any or all of embodiments sixteen to seventeen, as appropriate. In a nineteenth embodiment, the processing circuitry of the spindle controller may be configured to control the diagnostic switch assembly to control the first switch and the second switch to generate a reduced bus voltage on the logic supply bus, and the reduced bus voltage may be less than a nominal logic supply bus operating voltage. The nineteenth embodiment may be combined with any or all of embodiments sixteen to eighteen, as appropriate. In a twentieth embodiment, the nominal logic supply bus operating voltage is 48 volts and a nominal power bus operating voltage is 380 volts. The twentieth embodiment may be combined with any or all of embodiments sixteen to nineteen, as appropriate. In a twenty-first embodiment, the processing circuitry of the spindle controller may be configured to receive a safe torque off (STO) signal from the bus control device, and control an STO switch of the spindle assembly to determine a presence and a location of a fault on the STO bus. The twenty-first embodiment may be combined with any or all of embodiments sixteen to twenty, as appropriate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A spindle system comprising:
    a bus control device configured to control a power bus and a logic supply bus; and
    a plurality of spindle assemblies, each spindle assembly being powered via an operable coupling to the power bus and the logic supply bus, each spindle assembly being controlled via communications with the bus control device, the plurality of spindle assemblies comprising a first spindle assembly;
    wherein the first spindle assembly comprises:
        a power source interface configured to be operably coupled to the power bus and to power the first spindle assembly via the power bus;
        a spindle controller comprising processing circuitry;
        a diagnostic switch assembly operably coupled to the spindle controller and operably coupled to a logic supply bus; and
        a working apparatus comprising a motor and a spindle operably coupled to the spindle controller, the working apparatus being controllable by the spindle controller to act upon a work piece to perform a work task;
    wherein the processing circuitry of the spindle controller is powered by the logic control bus and is configured to:
        receive a fault localization instruction from the bus control device; and
        control the diagnostic switch assembly to determine a presence and a location of a fault on the logic supply bus; and
        transmit a responsive communication to the bus control device indicative of the presence and the location of the fault.

2. The spindle system of claim 1, wherein the diagnostic switch assembly further comprises a shunt resistor connected to the logic supply bus;
    wherein the processing circuitry is configured to measure a current through the shunt resistor.

3. The spindle system of claim 2, wherein the processing circuitry of the spindle controller is further configured to transmit the responsive communication to the bus control device indicative of the current measured through the shunt resistor for use in determining the presence and the location of the fault on the logic supply bus.

4. The spindle system of claim 1, wherein the bus control device is configured to transmit the fault localization instruction to the first spindle assembly in response to detecting the fault on the logic supply bus.

5. The spindle system of claim 1, wherein the bus control device is configured to transmit the fault localization instruction to the first spindle assembly in response to a start-up operation of the spindle system.

6. The spindle system of claim 1, wherein the bus control device is configured to transmit the fault localization instruction with an address of the first spindle assembly to cause only the first spindle assembly of the plurality of spindle assemblies to act upon the fault localization instruction.

7. The spindle system of claim 6, wherein the bus control device is configured to transmit the fault localization instruction as one of a series of fault localization instructions, each fault localization instruction in the series of fault localization instructions being addressed to a respective one of the plurality of spindle assemblies.

8. The spindle system of claim 7, wherein the bus control device is configured to transmit the series of fault localization instructions in an order moving serially downstream from a power source of the logic supply bus.

9. The spindle system of claim 8, wherein the plurality of spindle assemblies are configured to be connected in a daisy-chain configuration with respect to the logic supply bus.

10. The spindle system of claim 1, wherein the diagnostic switch assembly comprises a first switch and a second switch, the first switch being controllable to open circuit the control bus and the second switch being controllable to connect a resistance in series with the logic supply bus when the first switch is open.

11. The spindle system of claim 10, wherein the processing circuitry of the spindle controller is configured to control the diagnostic switch assembly to control the first switch and the second switch to generate a reduced bus voltage on the logic supply bus, the reduced bus voltage being less than a nominal logic supply bus operating voltage.

12. The spindle system of claim 1, wherein the processing circuitry of the spindle controller is configured to:
receive a safe torque off (STO) signal from the bus control device; and
control an STO switch of the spindle assembly to determine a presence and a location of a fault on the STO bus.

13. A spindle system comprising:
a bus control device configured to control a power bus and a logic supply bus; and
a plurality of spindle assemblies, each spindle assembly being powered via an operable coupling to the power bus and the logic supply bus, each spindle assembly being controlled via communications with the bus control device, the plurality of spindle assemblies comprising a first spindle assembly;
wherein the first spindle assembly comprises:
a power source interface configured to be operably coupled to the power bus and power the first spindle assembly via the power bus;
a spindle controller comprising processing circuitry;
a diagnostic switch assembly operably coupled to the spindle controller and operably coupled to a logic supply bus; and
a working apparatus comprising a motor and a spindle operably coupled to the spindle controller, the working apparatus being controllable by the spindle controller to act upon a work piece to perform a work task;
wherein the diagnostic switch assembly comprises a first switch, a second switch, and a shunt resistor connected to the logic supply bus; the first switch being controllable to open circuit the logic supply bus and the second switch being controllable to connect a resistance in series with the logic supply bus when the first switch is open;
wherein the processing circuitry of the spindle controller is powered by the logic supply bus and is configured to:
receive a fault localization instruction from the bus control device; and
control the diagnostic switch assembly to determine a presence and a location of a fault on the logic supply bus by being configured to:
control the first switch and the second switch to generate a reduced bus voltage on the logic supply bus, the reduced bus voltage being less than a nominal logic supply bus operating voltage;
measure a current through the shunt resistor at the reduced bus voltage; and
transmit a responsive communication to the bus control device indicative of the current measured through the shunt resistor for use in determining the presence and the location of the fault on the logic supply bus.

14. The spindle system of claim 13, wherein the bus control device is configured to transmit the fault localization instruction as one of a series of fault localization instructions in an order moving serially downstream from a power source of the logic supply bus, each fault localization instruction in the series of fault localization instructions being addressed to a respective one of the plurality of spindle assemblies.

15. The spindle system of claim 13, wherein the plurality of spindle assemblies are configured to be connected in a daisy-chain configuration with respect to the logic supply bus.

16. A spindle assembly comprising:
a power source interface configured to be operably coupled to a power bus and power the spindle assembly via the power bus;
a spindle controller comprising processing circuitry, the spindle controller being power by a logic supply bus;
a diagnostic switch assembly operably coupled to the spindle controller and operably coupled to the logic supply bus; and
a working apparatus comprising a motor and a spindle operably coupled to the spindle controller, the working apparatus being controllable by the spindle controller to act upon a work piece to perform a work task;
wherein the processing circuitry of the spindle controller is configured to:
receive a fault localization instruction from a bus control device operably coupled to the logic supply bus; and
control the diagnostic switch assembly to determine a presence and a location of a fault on the logic supply bus; and
transmit a responsive communication to the bus control device indicative of the presence and the location of the fault.

17. The spindle assembly of claim 16, wherein the diagnostic switch assembly further comprises a shunt resistor connected to the logic supply bus;
wherein the processing circuitry is configured to measure a current through the shunt resistor and transmit the responsive communication to the bus control device indicative of the current measured through the shunt resistor for use in determining the presence and the location of the fault on the logic supply bus.

18. The spindle assembly of claim 17, wherein the diagnostic switch assembly comprises a first switch and a second switch, the first switch being controllable to open circuit the control bus and the second switch being controllable to connect a resistance in series with the logic supply bus when the first switch is open.

19. The spindle assembly of claim 18, wherein the processing circuitry of the spindle controller is configured to control the diagnostic switch assembly to control the first switch and the second switch to generate a reduced bus voltage on the logic supply bus, the reduced bus voltage being less than a nominal logic supply bus operating voltage.

20. The spindle assembly of claim 16, wherein the processing circuitry of the spindle controller is configured to:
   receive a safe torque off (STO) signal from the bus control device; and
   control an STO switch of the spindle assembly to determine a presence and a location of a fault on the STO bus.

\* \* \* \* \*